Patented Jan. 29, 1924.

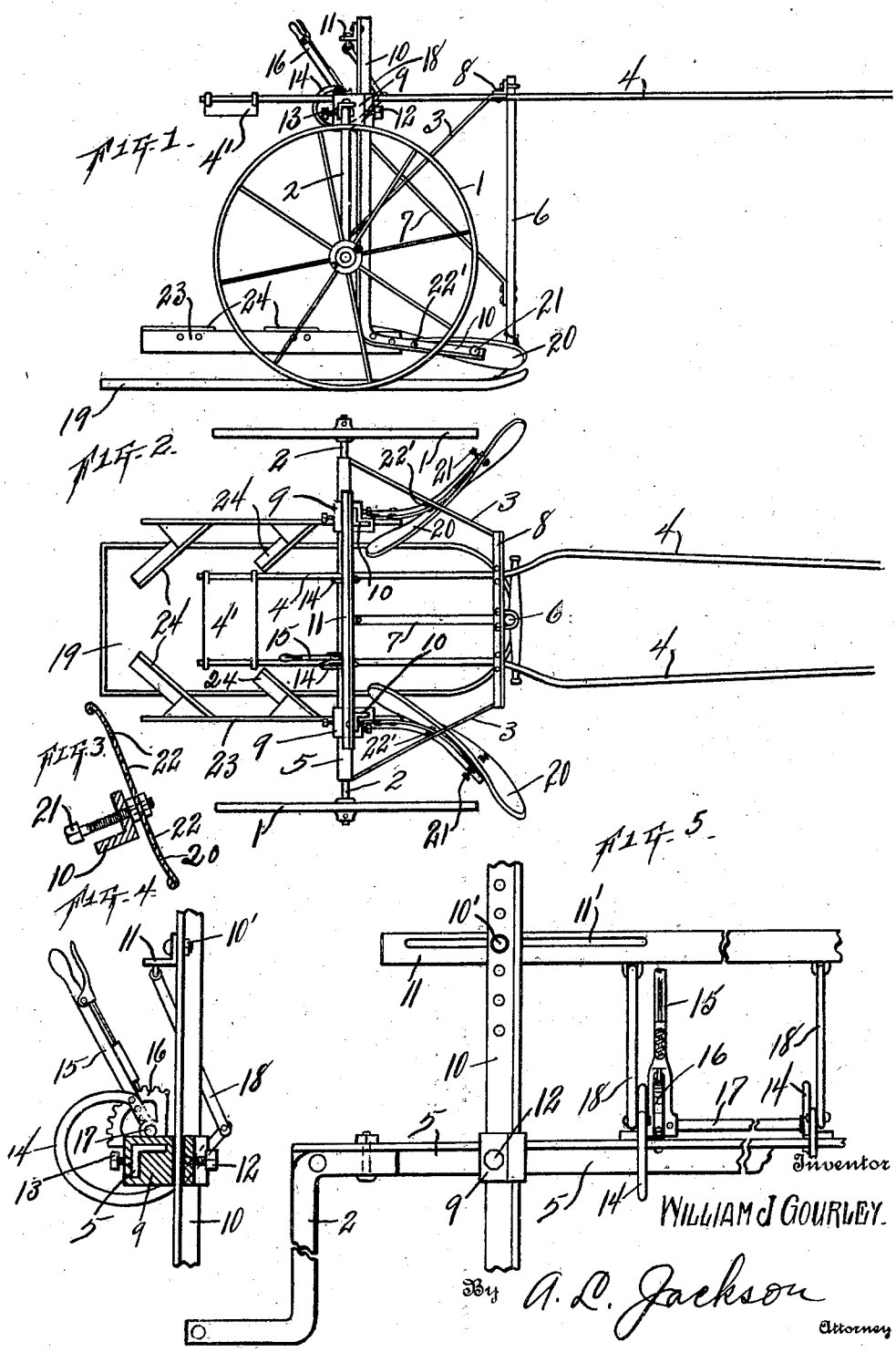

1,482,006

UNITED STATES PATENT OFFICE.

WILLIAM J. GOURLEY, OF WEATHERFORD, TEXAS.

INSECT-EXTERMINATING MACHINE.

Application filed July 13, 1923. Serial No. 651,265.

*To all whom it may concern:*

Be it known that I, WILLIAM J. GOURLEY, a citizen of the United States, residing at Weatherford, in the county of Parker and State of Texas, have invented certain new and useful Improvements in Insect-Exterminating Machines, of which the following is a specification.

My invention relates to a machine for gathering insects from growing plants; and the object is to provide a simple and economical machine by which insects can be shaken from growing plants and collected into a suitable receptacle so that they can be destroyed. It is well known that boll weevils and boll worms are very destructive to cotton, and that they are difficult to catch and destroy because they hide in the squares. They also puncture the squares and small bolls and deposit eggs therein. These bolls and squares, as well as the matured weevil, must be caught and destroyed because the squares and bolls contain the larvæ which soon develop into boll weevils. The object of this invention is to provide a machine by which smal bolls and squares and weevils can be economically gathered so that they can be destroyed. The boll weevil can be readily caught and destroyed because it will sulk when disturbed and not try to escape. The machine will be fully explained in the following description and the invention will be more particularly pointed out in the claims.

Reference is had to the accompanying drawings which form a part of this application. Fig. 1 is a side elevation of the machine.

Fig. 2 is a plan view of the same.

Fig. 3 is a detail sectional view of one of the gatherers.

Fig. 4 is an enlarged detail view of the casting for lateral adjustment of the hangers.

Fig. 5 is an enlarged broken front elevation of the hanger mechanism, and the means for adjusting the same.

Similar characters of reference are used to indicate the same parts throughout the several views.

The machine is provided with supporting wheels 1, and axle 2 carried by the wheels 1. The axle 2 is bent upwardly and attached to an angle iron frame member 5. Shafts 4 are attached to the frame member 5. The wheels 1, axle 2, frame member 5, and shafts 4 together with braces 3 and cross bar 8 constitute a truck. The cross bar 8 is attached to the shafts 4 and braces 3 are attached to the bar 8 and to the lower parts of the shanks of the axle member 2. A gathering pan 19 is provided and connected to the front part of the machine by a hanger 6 which is attached to the pan and to the cross bar 8. The hanger 6 is braced by a bar 7 which is attached to the hanger 6 and to the frame member 5. The shaft bars 4 are extended to the rear of the frame 5 and a seat 4' is mounted on the bars 4. Vertically disposed hangers 10 are attached to the frame member 5 by clamps 9 and set screws or bolts 12, and the clamps 9 are adjustably attached to the frame member 5 so that the machine can be adapted to rows of cotton of different widths by moving the clamps laterally and attaching the same to the frame member 5 by set screws 13. The object of the hanger 10 is to mount the gatherers 20 and the bumper bars 23. The hangers 10 are bent horizontally forward at the lowest part, and the gatherers 20 are attached thereto by bolts 21. The gatherers 20 have a plurality of holes 22 for varying the angle of the gatherers by placing the bolts 22' in different openings 22.

The bumper bars 23 are attached to the horizontal portion of the hangers 10 and bumpers 24 are attached to the bars 23 and project out over the pan 19 for agitating the cotton stalks. The upper ends of the hangers 10 are braced by cross bar 11 and this bar has slots 11' so that the attaching bolts 10' may be adjusted laterally in the bar 11.

Provision is made for adjusting the hangers 10 vertically. A rack 16 is attached to the frame member 5. A lever 15 is provided with a fulcrum 17 and provided with a spring actuated dog for engaging the rack 16 for holding the lever at different adjustments. A spring bar 14 is attached to the lever 15 and curved downward and forward and a link bar 18 is attached to the bar 14 and to the cross bar 11.

What I claim is:—

1. An insect exterminating machine comprising a wheeled truck, a gathering pan dragged by said truck, a frame member for said truck, hangers supported on said frame and vertically and laterally adjustable thereon, said hangers having horizontal forward extensions at their lower ends, gatherers attached to said extension and flared outwardly at their forward ends and projecting over said pan at their rear ends, bumper bars attached to said extensions, and a plurality of bumpers attached to each bumper bar and projecting over said pan.

2. An insect gathering machine comprising a wheeled truck and a frame therefor, a gathering pan dragged by said truck, hangers supported on said frame and means for adjusting the same laterally thereon, said hangers having horizontal forward extensions at their lower ends, gatherers attached to said extensions and flared outwardly at their forward ends and projecting over said pan at their rear ends, means for adjusting said gatherers at different angles on said extensions, bumper bars attached to said extensions, and a plurality of bumpers attached to said bumper bar and projecting out over said pan.

3. An insect gathering machine comprising a wheeled truck including a frame therefor, a gathering pan dragged by said truck, hangers supported on said frame and means for adjusting the same vertically thereon, said hangers having horizontal forward curved extensions at their lower ends, gatherers attached to said extensions and flared outwardly at their forward ends and projecting over said pan at their rear ends and serving as bumpers for agitating the plants, means for adjusting said gatherers at different angles on said extensions and bumper bars attached to said extensions, and a plurality of bumpers attached to each bumper bar and projecting over said pan.

In testimony whereof, I set my hand, this 7th day of October, 1922.

WILLIAM J. GOURLEY.